(12) United States Patent
Chin

(10) Patent No.: US 8,680,740 B2
(45) Date of Patent: Mar. 25, 2014

(54) STATOR WITH INTERMEDIATE TEETH

(75) Inventor: Robert Chin, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/219,660

(22) Filed: Aug. 27, 2011

(65) Prior Publication Data

US 2011/0309712 A1 Dec. 22, 2011

Related U.S. Application Data

(63) Continuation of application No. PCT/EP2010/051491, filed on Feb. 8, 2010.

(30) Foreign Application Priority Data

Feb. 27, 2009 (EP) ..................... 09153981

(51) Int. Cl.
  *H02K 1/10* (2006.01)
  *H02K 3/16* (2006.01)
  *H02K 3/20* (2006.01)
  *H02K 17/28* (2006.01)
  *H02K 19/26* (2006.01)

(52) U.S. Cl.
  USPC ............... 310/269; 310/186; 310/216.069; 310/216.071; 310/216.072

(58) Field of Classification Search
  USPC ............... 310/186, 269, 216.096, 216.064
  IPC .............................. H02K 19/26,21/00
  See application file for complete search history.

(56) References Cited

U.S. PATENT DOCUMENTS

| 4,883,999 | A | * | 11/1989 | Hendershot | 310/216.071 |
| 5,095,238 | A | * | 3/1992 | Suzuki et al. | 310/156.46 |
| 5,739,614 | A | * | 4/1998 | Suzuki et al. | 310/180 |
| 6,094,011 | A | * | 7/2000 | Notsu | 315/78 |
| 6,359,359 | B1 | * | 3/2002 | Miura et al. | 310/156.43 |
| 8,084,913 | B2 | * | 12/2011 | Telep et al. | 310/216.096 |
| 2005/0029890 | A1 | | 2/2005 | Kadoya et al. | |
| 2005/0258706 | A1 | * | 11/2005 | Horst et al. | 310/218 |
| 2008/0290751 | A1 | * | 11/2008 | Hwang et al. | 310/156.01 |

FOREIGN PATENT DOCUMENTS

| EP | 1657802 A1 | 5/2006 |
| JP | H09233790 A | 9/1997 |
| JP | 10234144 A | 9/1998 |
| JP | H11234990 A | 8/1999 |
| JP | 2001245460 A | 9/2001 |
| JP | 2004215483 A | 7/2004 |
| JP | 2004304928 A | 10/2004 |
| WO | 2006058871 A2 | 6/2006 |

OTHER PUBLICATIONS

Machine translation of JP10234144, Kawamata et al., Feb. 1998.*

(Continued)

*Primary Examiner* — Terrance Kenerly
(74) *Attorney, Agent, or Firm* — St. Onge Steward Johnston & Reens LLC

(57) ABSTRACT

A stator for an electrical machine, the stator including a plurality of stator teeth distributed in a non-uniform pattern with a short and long tooth spans along a circumference of the stator, wherein each stator slot between two stator teeth distanced by a long tooth span including an intermediate tooth for carrying a magnetic flux.

5 Claims, 4 Drawing Sheets

(56) References Cited

OTHER PUBLICATIONS

Doctoral thesis from Jürgen Friedrich, "Bauformen and Betriebsverhalten modularer Dauermagnetmaschinen", Universität der Bundeswehr München, Neubiberg 1991, pp. 28-36 (16 pages total).

International Preliminary Report on Patentability; Application No. PCT/EP2010/051491; Issued: May 25, 2011; 8 pages.

International Search Report and Written Opinion of the International Searching Authority; Application No. PCT/EP2010/051491; Issued: Oct. 28, 2010; 13 pages.

Krasser; "Optimierte Auslegung Einer Modularen Dauermagnetmaschine Für ein Autarkes Hybridfahrzeug, Kapitel 2"; Dissertation Fakultaet Fuer Elektrotechnik Undinformationstechnik Der Technischen Universitaet Muenchen Zurerlangung Des Akademischen Grades Eines Doktor-Ingenieurs, XX, XX, Sep. 20, 2000, pp. 1-16.

Notice of Reasons for Rejection Application No. 2011-551453 Issued: May 7, 2013 10 pages.

* cited by examiner

US 8,680,740 B2

STATOR WITH INTERMEDIATE TEETH

CROSS-REFERENCE TO RELATED APPLICATIONS

The present application is a continuation of pending International patent application PCT/EP2010/051491 filed on Feb. 8, 2010 which designates the United States and claims priority from European patent application 09 153981.7 filed on Feb. 27, 2009, the content of which is incorporated herein by reference.

FIELD OF THE INVENTION

The present invention relates to improving a winding factor of an electrical machine by modifying stator slots.

BACKGROUND OF THE INVENTION

Industrial applications such as pulp and paper production, plastic extrusion, conveyor belts and wind power generation are generally characterized by a low-speed and high-torque performance. Permanent magnet (PM) machines with a concentrated winding topology are an attractive alternative for these applications since they are able to provide the desired performance when being direct-driven. A gearbox can be eliminated, which in turn reduces the costs and increases the efficiency.

A concentrated winding topology means that each armature coil is wound around one single stator tooth in an electrical machine. Such winding configuration offers a large reduction of copper material compared with distributed winding topology where the coils are wound in laps enclosing several stator teeth. The coil overhang of the distributed winding topology produces unnecessary copper losses and extends the stator's axial dimension, which reduces torque density (or power density for given speed). The concentrated winding topology thus provides the advantages of reduced total active volume and weight of the machine. The use of less coil material also offers a favourable reduction in copper loss and hence a high torque density motor design can be obtained.

A flux linkage between rotor poles and the coils, i.e. a winding factor, is an important design aspect. The maximum average torque output is directly proportional to the winding factor, a higher winding factor implying a higher output torque for a motor with a given frame size. The distributed winding topology provides a winding factor equal to or nearly equal to the ideal value of one. Concentrated winding topology, on the other hand, typically has a lower winding factor lying within the range of 0.93-0.96. In theory, an ideal winding factor can be easily achieved with a concentrated winding topology by choosing the number of stator teeth being equal to the number of rotor poles, but in practice this causes a severe cogging problem. Therefore, the rotor pole number is typically different from the stator teeth number. In most cases the rotor pole number is less than the stator teeth number, but in the following example, in order to better illustrate the present invention, a conventional machine is chosen to have a rotor pole number which is greater than the stator tooth number.

FIG. 1 shows a conventional PM machine 100 with concentrated armature coils 102, a stator 104 having 18 teeth 106 and the rotor 108 having 20 poles 110 (10 pole pairs). The coils 102 are arranged in two winding periodicities 112, each winding periodicity 112 comprising three stator tooth sections 114 representing three electrical phases, and each stator tooth section 114 comprising three stator teeth 106 in a same electrical phase. The stator teeth 106 are distributed along a circumference of the stator 104 with a uniform tooth span 115 i.e. a uniform angular distance between two adjacent stator teeth 106. The stator teeth 106 are separated from one another by stator slots 118.

A doctoral thesis from Jürgen Friedrich, "Bauformen und Betriebsverhalten modularer Dauermagnetmaschinen", Universität der Bundeswehr München, Neubiberg 1991, discloses on pages 28-36 PM machines with non-uniform stator tooth patterns. In some embodiments there are intermediate teeth with variable width between the stator teeth, and in other embodiments stator tooth sections in a same electrical phase are separated from one another by widened stator slots. By these measures the winding factor appears to be optimized, but at the same time the non-wound intermediate teeth and the widened stator slots appear to deteriorate the overall torque density. In all embodiments disclosed in this thesis there is only a single winding periodicity.

From the foregoing, the desire to improve the overall torque density of an electrical machine with a concentrated winding topology remains.

SUMMARY OF THE INVENTION

One object of the invention is to provide a stator for an electrical machine with an improved torque density.

A further object of the invention is to provide an electrical machine with an improved torque density.

A yet further object of the invention is to provide a method for improving the torque density of an electrical machine.

According to a first aspect of the invention there is provided a stator for an electrical machine, the stator comprising a plurality of stator teeth, the stator teeth being separated from one another by stator slots, each stator tooth being surrounded by a concentrated armature coil, the armature coils representing two or more different electrical phases, the stator teeth being distributed in a non-uniform pattern along a circumference of the stator, the non-uniform pattern comprising at least one short tooth span and at least one long tooth span, the short tooth span having a smaller dimension than the long tooth span, wherein none of the stator slots between two stator teeth distanced by a short tooth span is configured to carry magnetic flux while each of the stator slots between two stator teeth distanced by a long tooth span comprises an intermediate tooth for carrying a magnetic flux.

By providing a stator with a non-uniform stator tooth pattern comprising short and long tooth spans, and by introducing intermediate teeth between stator teeth distanced by a long tooth span, both the winding factor and the distribution of the flux carrying material can be optimized.

According to one embodiment of the invention there is a long tooth span between each pair of adjacent stator teeth with coils in different electrical phases. Providing long tooth spans according to this principle results to a relatively high number of relatively narrow intermediate teeth. This increases the number of alternatives when dividing the stator into a plurality of segments.

According to one embodiment of the invention there is one long tooth span per winding periodicity, each winding periodicity comprising one stator tooth section for each different electrical phase, each stator tooth section comprising one or more stator teeth with coils in the same electrical phase. Providing long tooth spans according to this principle results to a relatively low number of relatively wide intermediate teeth. In this case all stator teeth and all intermediate teeth are at a certain point of time perfectly aligned with the rotor poles, enabling an improved machine performance.

According to one embodiment of the invention the stator is divided into segments such that a contact surface between two adjacent segments crosses at least one intermediate tooth. Dividing a stator into segments improves the handling of the stators as such stators can have very large dimensions leading to problems in transport and logistics. By situating the contact surfaces between adjacent segments at the intermediate teeth the magnetic properties of the stator are minimally affected. The fact that the intermediate teeth are not surrounded by any coil makes them ideal to be used for connecting the adjacent segments mechanically together.

According to one embodiment of the invention the stator is divided into six, three or two segments. These are the natural number of segments following from the number of intermediate teeth in the preferred embodiments of the invention.

According to one embodiment of the invention the stator is comprised in an electrical machine which further comprises a rotor having a plurality of poles, wherein the short tooth span is substantially equal to a pole span. A winding factor equal to one is achieved by making the short tooth span to correspond to the pole span.

According to one embodiment of the invention the poles comprise permanent magnets. Permanent magnet poles are preferred for their simplicity even if electrically excited poles may also be used.

According to one embodiment of the invention the pole number is greater than the stator tooth number. By this measure room for the intermediate teeth is created by bringing the stator teeth together such that the short tooth span corresponds to the pole span According to a second aspect of the invention there is provided a method for improving a torque density of an electrical machine, the method comprising the steps of: providing a stator comprising a plurality of stator teeth, the stator teeth being separated from one another by stator slots, each stator tooth being surrounded by a concentrated armature coil, the armature coils representing two or more different electrical phases, the stator teeth being distributed in a non-uniform pattern along a circumference of the stator, the non-uniform pattern comprising at least one short tooth span and at least one long tooth span, the short tooth span having a smaller dimension than the long tooth span; configuring the stator slots between two stator teeth distanced by a short tooth span not to carry magnetic flux; and providing each of the stator slots between two stator teeth distanced by a long tooth span with an intermediate tooth for carrying a magnetic flux.

BRIEF DESCRIPTION OF THE DRAWINGS

The invention will be explained in greater detail with reference to the accompanying drawings, wherein.

DETAILED DESCRIPTION OF THE INVENTION

Figure 1:
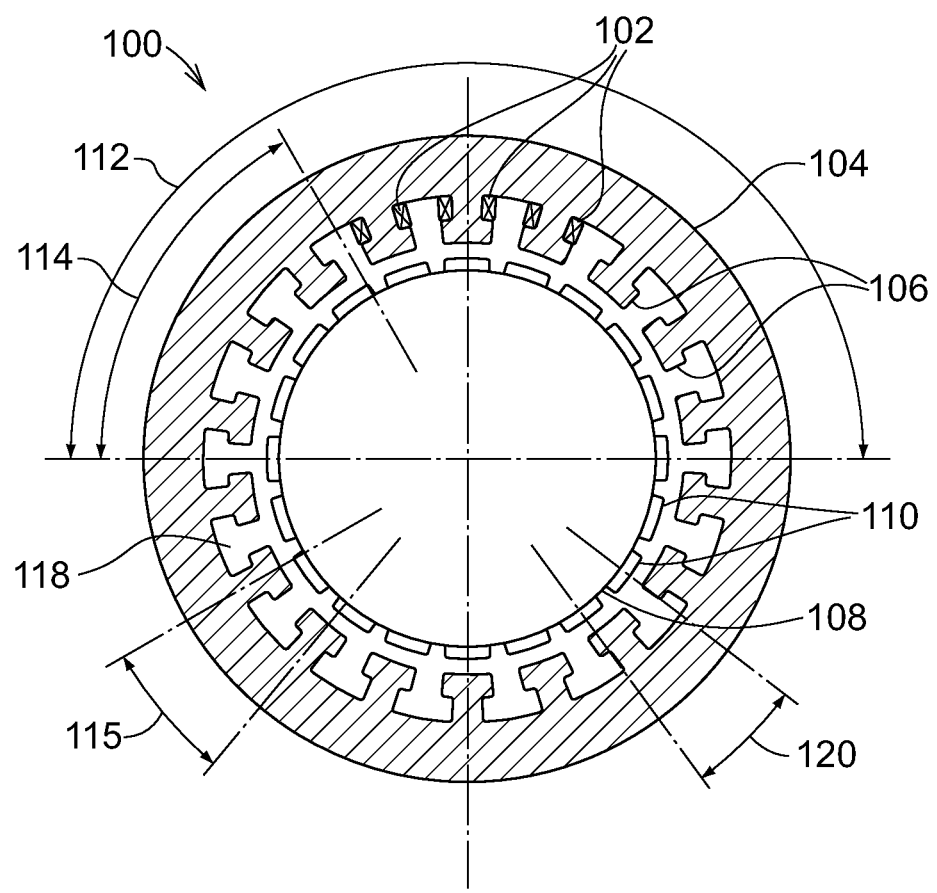
FIG. 1 shows a conventional PM machine with a uniform tooth span.
Figure 2:
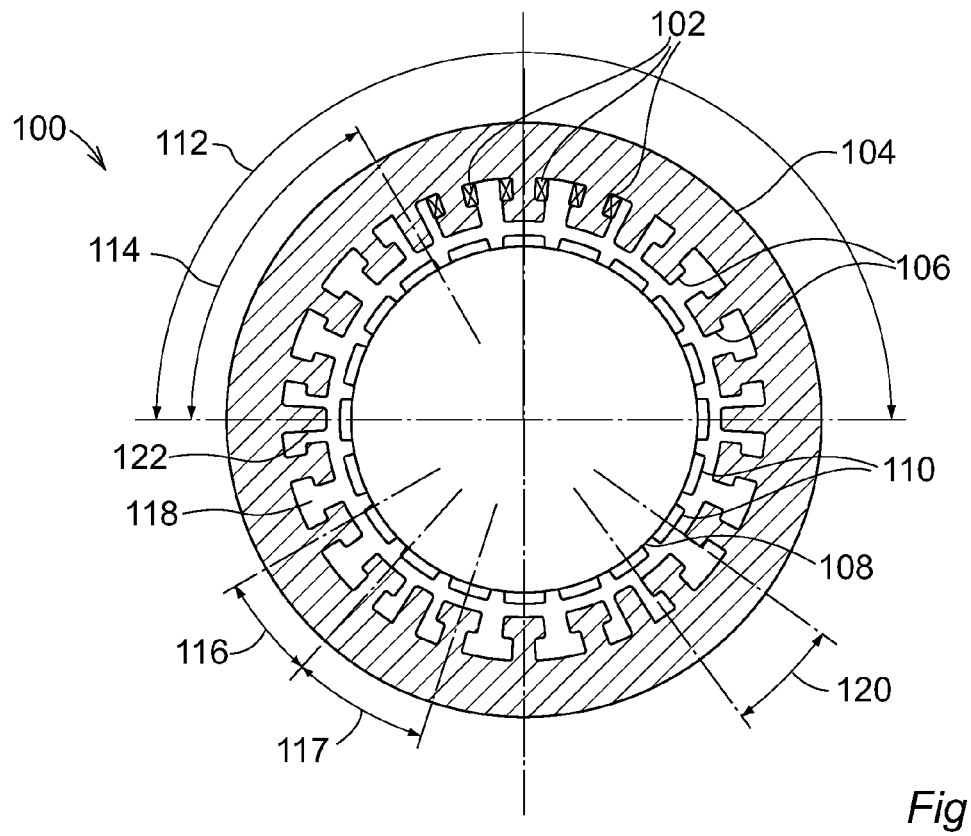
FIG. 2 shows one embodiment of the invention with intermediate teeth between stator teeth in different stator tooth sections.

Referring to FIG. 2, a PM machine 100 is shown which comprises the same number of stator teeth 106, rotor poles 110, winding periodicities 112 and electrical phases as the machine 100 according to FIG. 1. The stator teeth 106 are, however, not distributed with uniform distances. Instead, there is provided a long tooth span 117 between stator teeth 106 in different stator tooth sections 114, and a short tooth span 116 between the stator teeth 106 within each stator tooth section 114. The short tooth span 116 is equal to a pole span 120 i.e. an angular distance between two rotor poles 110. Following from the relation between the stator tooth number, the rotor pole number and the number of stator tooth sections 114, in the present embodiment the width (in degrees) of each long tooth span 117 is 1⅓ times the width of each pole span 120. Intermediate teeth 122 are introduced between the stator teeth 106 in different stator tooth sections 114, the width of each intermediate tooth 122 corresponding to ⅓ of the pole span 120.

Figure 3:
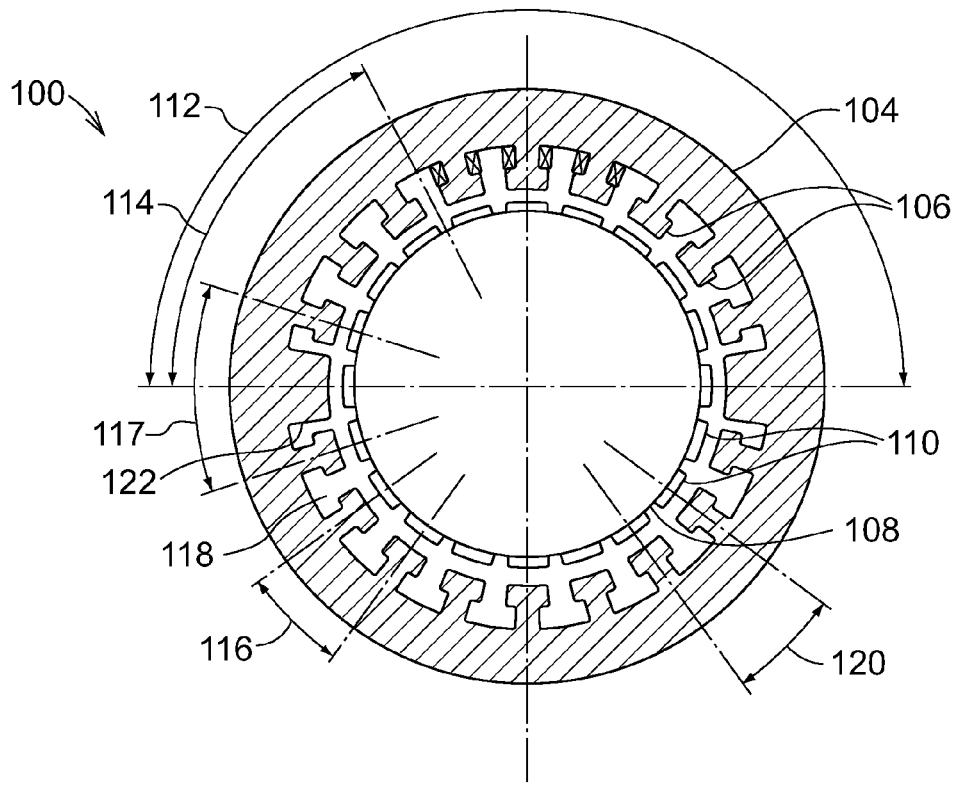
FIG. 3 shows one embodiment of the invention with one intermediate tooth per winding periodicity.

Referring to FIG. 3, a PM machine 100 is shown which again comprises the same number of stator teeth 106, rotor poles 110, winding periodicities 112 and electrical phases as the machine 100 according to FIG. 1. This time a long tooth span 117 is provided between stator teeth 106 in different winding periodicities 112 while the stator teeth 106 within each winding periodicity 112 are separated by a short tooth span 116. Following from the relation between the stator tooth number and the rotor pole number, in the present embodiment the long tooth span 117 is two times the pole span 120. Intermediate teeth 122 are introduced between the stator teeth 106 in different winding periodicities 112, the width (in degrees) of each intermediate tooth 122 corresponding to the pole span 120.

Figure 4A:
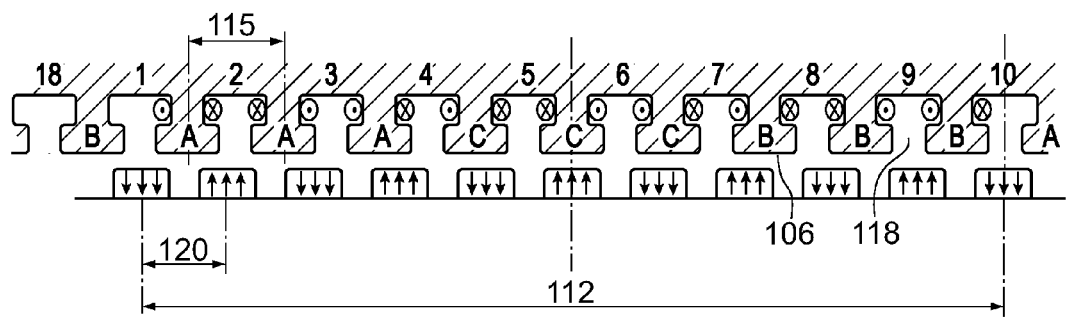
FIGS. 4a-4c show one winding periodicity for a conventional machine and for two embodiments of the invention.
Figure 4B:
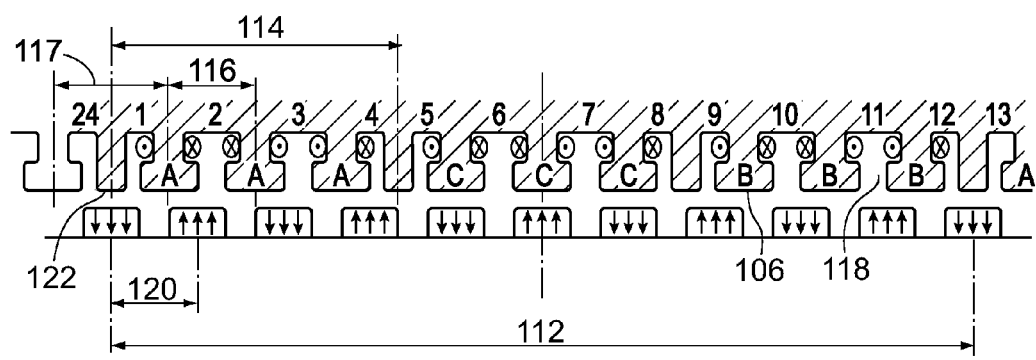
Figure 4C:
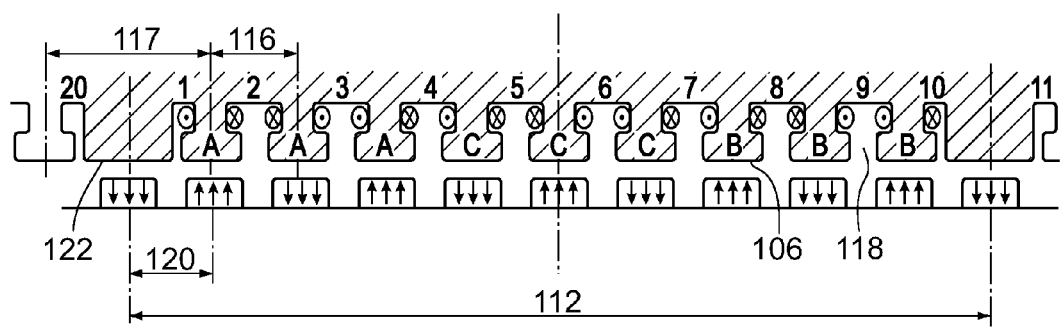

FIG. 4a shows one winding periodicity 112 for the conventional machine 100 according to FIG. 1 while FIGS. 4b and 4c show the same for the machines 100 according to FIGS. 2 and 3, respectively. It can be seen that in the machines 100 with non-uniform tooth spans 116, 117 all the stator teeth 106 within each stator tooth section 114 (see FIG. 4b, phase C) or winding periodicity 112 (see FIG. 4c), are at a certain point of time perfectly aligned with respective rotor poles 110. Such perfect alignment enables the ideal winding factor value of one. In the conventional machine 100 the perfect alignment is never reached (see FIG. 4a), and consequently the winding factor will always remain under the ideal value.

Figure 5A:
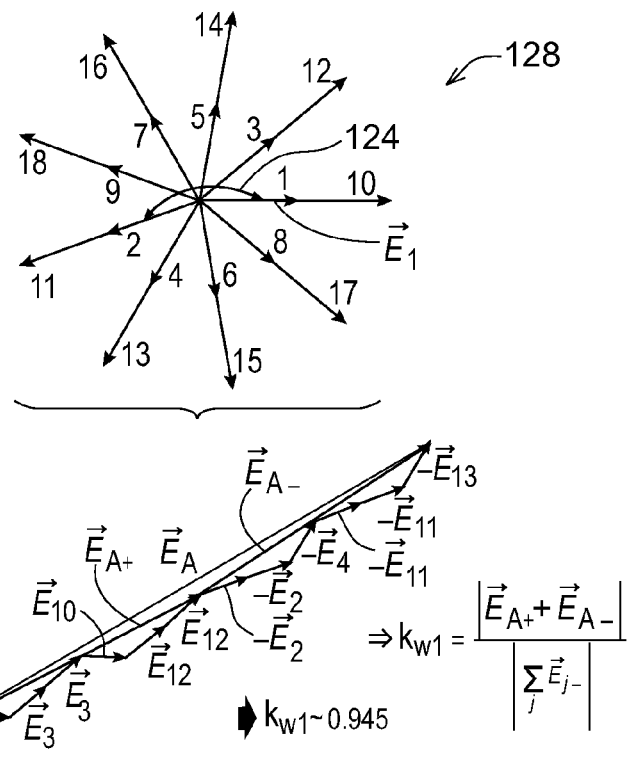
FIGS. 5a-5b show stator stars of plots for a conventional machine and for one embodiment of the invention.

The winding factor can be illustrated by utilizing the orientation of phasor elements $\vec{E}_j$ of a voltage induced on each individual coil side within the stator slots 118. The phasor elements $\vec{E}_j$ for the designs of FIGS. 4a and 4b are shown in the stator stars of plots 128 of FIGS. 5a and 5b. As is readily understood within the art, the orientations of the phasor elements $\vec{E}_j$ in the figures are given in electrical angles, an angular distance occupied by one pole pair corresponding to 360°. As can be seen in FIG. 5a, a first angular distance 124 corresponding to the uniform tooth span 115 of FIG. 4a is 200°. The phasor elements $\vec{E}_j$ corresponding to the coil sides of the same electrical phase in different stator slots 118 are not in the same direction, and when these phasor elements $\vec{E}_j$ are summed as further illustrated in FIG. 5a, the magnitudes of the resulting phasors $\vec{E}_{A+}$ and $\vec{E}_{A-}$ are less than the sum of the magnitudes of individual phasor elements $\vec{E}_j$.

Figure 5B:
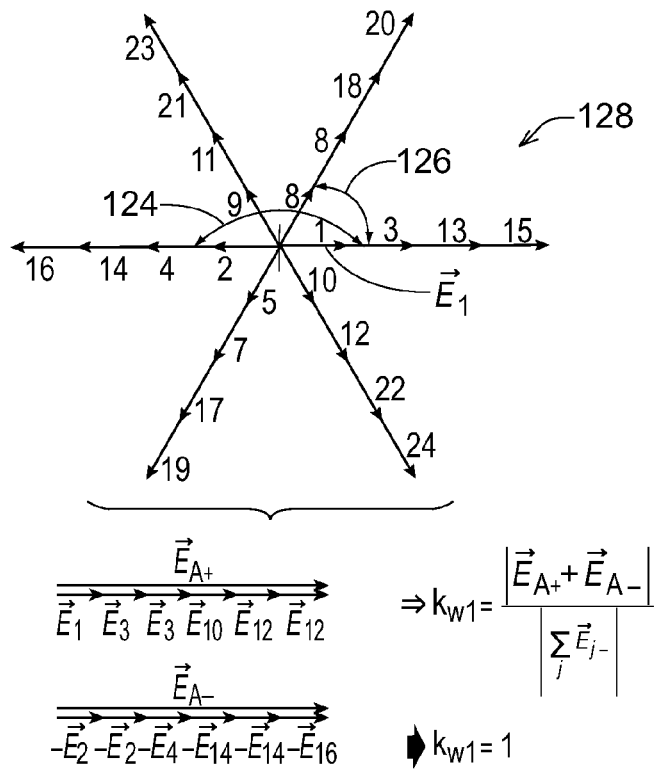

As can be seen in FIG. 5b, however, the first angular distance 124 corresponding to the short tooth span 116 is 180°. The phasor elements $\vec{E}_j$ corresponding to the coil sides of the same electrical phase in different stator slots 118 are all aligned in the same direction, and when these phasor elements $\vec{E}_j$ are summed, the magnitudes of the resulting phasors $\vec{E}_{A+}$ and $\vec{E}_{A-}$ are equal to the sum of the magnitudes of individual phasor elements $\vec{E}_j$. The long tooth spans 117 cause the phasor elements $\vec{E}_j$ in two adjacent stator tooth sections 114 to be angled by a second angular distance 126 of 60° corresponding to the width of an intermediate tooth 122. As illustrated in the FIGS. 5a and 5b, the fundamental winding factor $k_{w1}$ can be increased from 0.945 to one by aligning all the voltage phasor elements $\vec{E}_j$ in the same direction.

A stator star of plots for the design of FIG. 4c is not shown, but since all the stator teeth 106 within the winding periodicity 112 are separated by a short tooth span 116, and since the width of the intermediate teeth 122 corresponds to an angular distance of 180°, such star of plots would exhibit all the phasor elements $\vec{E}_j$ aligned on one horizontal line.

When there is a desire to divide a stator 104 into segments, the intermediate teeth 122 provide an ideal location for a contact surface between two of such segments. Since the intermediate teeth 122 are not surrounded by any coil 102, they can efficiently be used for connecting adjacent segments mechanically together. A contact surface at an intermediate tooth 122 also has a minimal effect on magnetic properties of the stator 104 because the magnetic flux can at least partially flow through one half of an intermediate tooth 122 without crossing the contact surface.

Depending on the number of intermediate teeth 122, a stator 104 can be divided in segments in a plurality of ways. For example, the stator 104 of FIG. 2 can be divided in six segments, each segment comprising one stator tooth section 114, or in three segments, each segment comprising two stator tooth sections 114, or in two segments, each segment comprising three stator tooth sections 114. The number of segments may be further increased by providing additional intermediate teeth 122. The segments do not need to be of equal size, and obviously any appropriate combination of different size segments may be used. For example, the stator 104 of FIG. 2 can be divided in four segments, one segment comprising three stator tooth sections 114, and three segments comprising one stator tooth section 114 each.

The number of stator teeth 106, rotor poles 110, winding periodicities 112 and electrical phases is not limited to those presented in the above embodiments, but these can be selected freely within reasonable limits. It is also not excluded to introduce intermediate tooth-like elements between two stator teeth 106 distanced by a short tooth span 116 as far as these elements are not configured to carry magnetic flux. Such elements can be introduced e.g. for cooling purposes or for supporting the armature coils 102 mechanically.

The invention is not limited to the embodiments shown above, but a person skilled in the art may modify them in a plurality of ways within the scope of the invention as defined by the claims.

What is claimed is:

1. A stator for an electrical machine, the stator comprising a plurality of stator teeth, the stator teeth being separated from one another by stator slots, each stator tooth being surrounded by a concentrated armature coil, the armature coils representing two or more different electrical phases, the stator teeth being distributed in a non-uniform pattern along a circumference of the stator, the non-uniform pattern comprising at least one short tooth span and at least one long tooth span, the short tooth span having a smaller dimension than the long tooth span, wherein none of the stator slots between two stator teeth distanced by a short tooth span is configured to carry magnetic flux while each of the stator slots between two stator teeth distanced by a long tooth span comprises an intermediate tooth for carrying a magnetic flux, wherein there is a long tooth span between each pair of adjacent stator teeth with coils in different electrical phases, characterized in that the electrical machine further comprises a rotor having a plurality of poles, each pole comprising a permanent magnet, the short tooth span being equal to a pole span, and the number of poles being different from ten and/or the number of stator teeth being different from nine.

2. The stator according to claim 1, wherein the stator is divided into segments such that a contact surface between two adjacent segments crosses at least one intermediate tooth.

3. The stator according to claim 2, wherein the stator is divided into six, three or two segments.

4. The electrical machine according to claim 1, wherein the pole number is greater than the stator tooth number.

5. A stator for an electrical machine, the stator comprising a plurality of stator teeth, the stator teeth being separated from one another by stator slots, each stator tooth being surrounded by a concentrated armature coil, the armature coils representing two or more different electrical phases, the stator teeth being distributed in a non-uniform pattern along a circumference of the stator, the non-uniform pattern comprising at least one short tooth span and at least one long tooth span, the short tooth span having a smaller dimension than the long tooth span, wherein none of the stator slots between two stator teeth distanced by a short tooth span is configured to carry magnetic flux while each of the stator slots between two stator teeth distanced by a long tooth span comprises an intermediate tooth for carrying a magnetic flux, characterized in that there is one long tooth span per winding periodicity, each winding periodicity comprising one stator tooth section for each different electrical phase, each stator tooth section having one or more stator teeth with coils in the same electrical phase, and that the electrical machine further comprises a rotor having a plurality of poles, each pole comprising a permanent magnet, wherein a width of each intermediate tooth corresponds to a pole span.

* * * * *